May 24, 1966  B. N. ROBINS  3,252,747
EYEGLASSES HAVING LENS FRAME PIVOTALLY
ATTACHED TO SUPPORT FRAME
Filed March 23, 1960  2 Sheets-Sheet 1

Betty N. Robins
INVENTOR.

BY *Clarence A. O'Brien*
*and Harvey B. Jacobson*
Attorneys

May 24, 1966  B. N. ROBINS  3,252,747
EYEGLASSES HAVING LENS FRAME PIVOTALLY
ATTACHED TO SUPPORT FRAME
Filed March 23, 1960  2 Sheets-Sheet 2
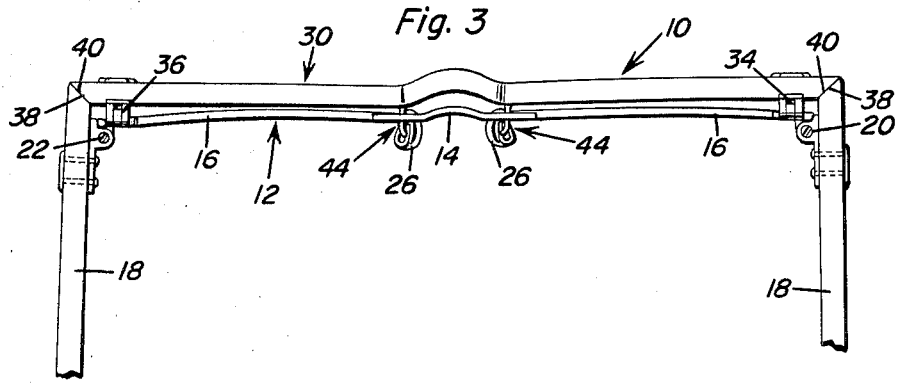
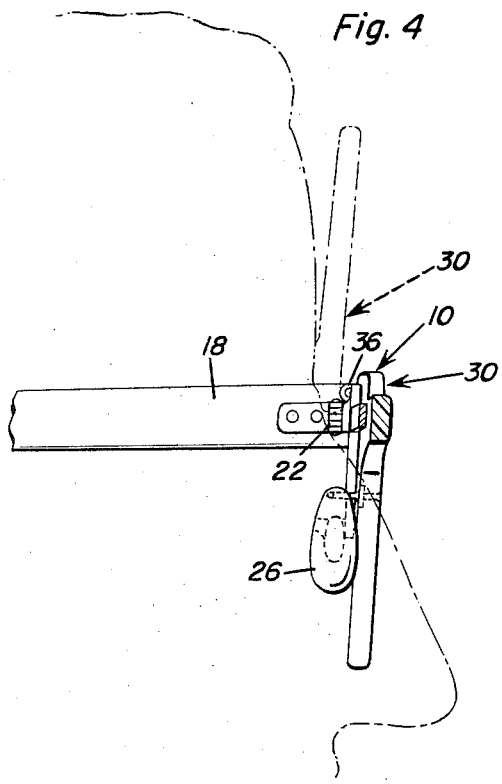
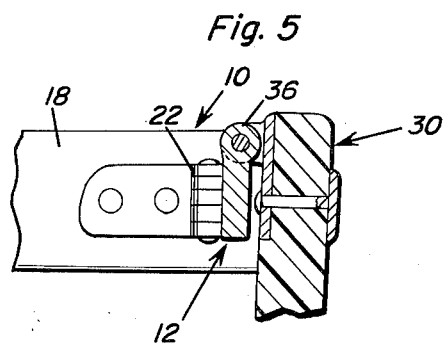
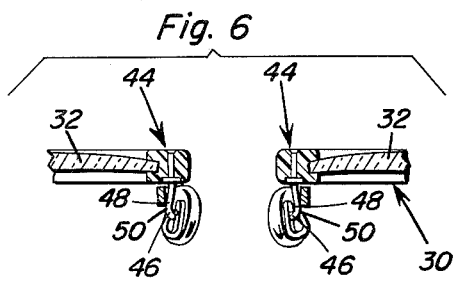
Betty N. Robins
INVENTOR.

United States Patent Office 3,252,747
Patented May 24, 1966

3,252,747
EYEGLASSES HAVING LENS FRAME PIVOTALLY
ATTACHED TO SUPPORT FRAME
Betty N. Robins, Detroit, Mich.
(17365 Westover Road, Southfield, Mich.)
Filed Mar. 23, 1960, Ser. No. 17,128
5 Claims. (Cl. 351—59)

This invention relates to novel and useful eyeglasses construction, and more particularly to eyeglasses construction utilizing a lens frame for supporting the lenses in alignment with the line of sight of the user which may be pivoted forwardly and upwardly out of the line of sight of the user.

For various reasons such as vanity and appearance many persons required to wear eyeglasses with specially ground lenses for reading close work and differently ground lenses for viewing distant objects do not wish to use the form of glasses construction specifically designed for these purposes referred to as bi-focals. Many persons requiring especially ground lenses for viewing close objects do not require any specially ground lenses for viewing distant objects. The eyeglasses construction of the instant invention is specifically designed for these persons who do not require specially ground lenses for viewing distant objects and who do not wish to make use of the type of glasses construction known as bi-focals.

The lens frame of the instant invention may be supplied with the appropriately ground lenses for the user to use for viewing near objects and the lens frame is mounted upon a main frame for swinging movement about a horizontal axis between a first position in alignment with the vision of the user and a second position pivoted forwardly and upwardly away from the eyes of the user.

Different forms of glasses construction designed for this purpose have previously been constructed but have not proven successful in correctly positioning the lens frame in front of the user's eyes each time the lens frame is pivoted to that position. Not only is the distance at which the lenses are positioned from the eyes important, but the angular relationship of the lenses to the line of sight is also extremely important.

It is therefore the main object of this invention to provide a glasses construction including a lens frame which may be pivoted out of the line of sight of the user if it is desired but which may be pivoted back in alignment with the line of sight of the user and retained in exactly the same position with respect to the glass construction each time the lens frame is pivoted in alignment with the line of sight of the user.

A further object of this invention is to provide an eyeglasses construction in accordance with the preceding object which will be pleasing in appearance and which will not give any obtrusive evidence of the glasses construction being other than of conventional design.

A further object of this invention, in accordance with the preceding objects, is to provide a limit for the pivotal movement of the lens frame toward the position in alignment with the vision of the user and to provide latch means for resiliently retaining the lens frame in that position against the limit.

A final object to be specifically enumerated herein is to provide a glasses construction which will conform to conventional forms of manufacture, be of simple construction and easy to operate so as to provide a device that will be economically feasible, relatively trouble free and an asset to persons capable of deriving benefits therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view of the glasses construction, parts of the temples thereof being broken away;

FIGURE 4 is a transverse vertical sectional view taken substantially upon the plane indicated by the section line 4—4 of FIGURE 2, the outline of the face of a user being shown in phantom lines;

FIGURE 5 is an enlarged fragmentary vertical sectional view taken substantially upon the plane indicated by the section line 5—5 of FIGURE 2; and FIGURE 6 is a fragmentary horizontal sectional view on somewhat of an enlarged scale taken substantially upon the plane indicated by the section line 6—6 of FIGURE 2.

Figure 1:
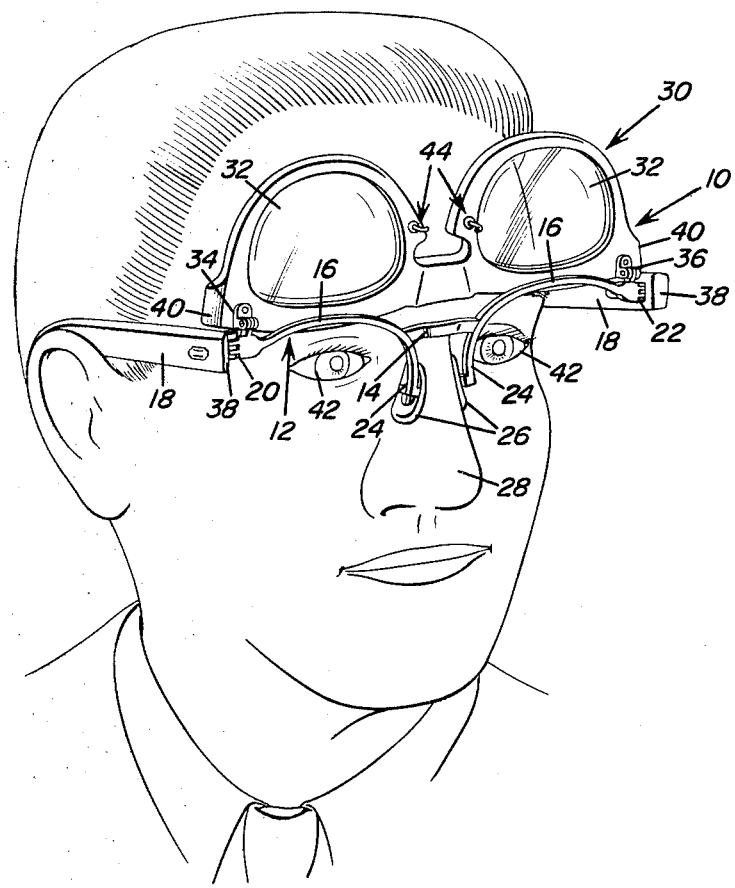
FIGURE 1 is a view in perspective view of the glasses construction shown supported in position upon the face of a user with the lens frame pivoted forwardly and upwardly from alignment with the line of vision of the user.

Referring now more specifically to the drawings the numeral 10 generally designates the glasses construction comprising the present invention. The eyeglasses construction 10 includes a main frame generally designated by the reference numeral 12 including a bridge 14 and a pair of outwardly extending arms 16. The inner ends of the arms 16 are secured to opposite ends of the bridge 14 in any convenient manner and a pair of temples 18 are pivotally secured at their forward ends to the outer end portions of the arms 16 for movement about upstanding axes by means of hinge assemblies 20 and 22. The inner ends of the arms 16 are curved downwardly to form opposing support legs 24 which each have secured to the lower end thereof a nose pad 26 for engagement with the nose 28 of the user. The temples 18 are pivotally secured to the main frame 12 for movement between positions folded across the rear of the main frame 12 and positions extending rearwardly therefrom and at substantially right angles thereto as illustrated in FIGURES 1 through 3.

The hinge assemblies 20 and 22 may be of conventional design and provided with suitable abutment means for limiting the pivotal movement of the temples 18 toward the extended position.

A lens frame generally designated by the reference numeral 30 having a pair of lenses 32 secured therein is pivotally secured to the main frame 12 at its outer ends for movement about aligned horizontally disposed axes by means of hinge assemblies 34 and 36. The hinge assemblies 34 and 36 may be of any suitable design and construction and it is to be noted that a part of each is formed integrally with the main frame 12.

Figure 2:
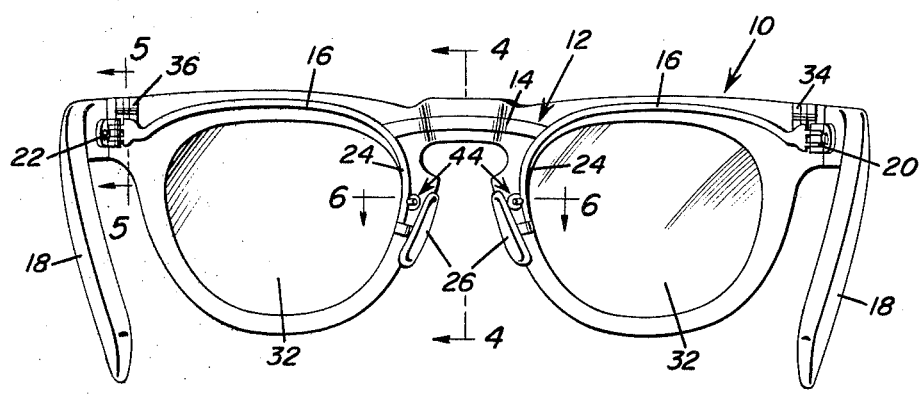
FIGURE 2 is a rear elevational view of the glasses construction with the lens frame pivoted to its normal position for alignment with the line of sight of a user.

With particular attention directed to FIGURE 2 of the drawings it will be noted that the glasses construction, when the lens frame 30 is pivoted to the normal position for alignment with the line of sight of the user, is of the modern design wherein the temples extend from the upper outer corners of the lens frame 30.

Each of the temples 18 is provided with a forward miter abutment surface 38 which abut the mitered abutment surfaces 40 formed on the outer ends of the lens frame 30 at the upper corners thereof, see FIGURE 3 in particular.

It is of course very important that the lenses 32 be positioned the correct distance from the eyes 42 of the user and also that they be correctly positioned in angular relationship to the line of the vision of the user. A person using eyeglasses normally has frames which are tailor made for the dimensions of his head and the frames are adjusted so that they consistently assume the same position each time they are worn. Previous glasses constructions of the type provided with lens frames swingably mounted for movement into and out of alignment with the line of vision of the user have not been provided with adequate means for consistenly and correctly positioning the pivoted lens frame with respect to the other components of the glasses construction each time the lens frame is pivoted into its normal position in alignment with the line of vision of the user.

When the temples 18 are pivoted to the extended position for embracing the opposite sides of the head of the user, the abutment surfaces 38 and 40 abut in surface to surface contacting relation to limit the pivoting movement of the lens frame 30 to the normal position in alignment with the line of vision of the user. Although the lens frame 30 cannot be pivoted from an out-of-the-way position beyond the normal position in alignment with the line of vision of the user, additional means must be provided for retaining the lens frame 30 in the normal position against movement forwardly and upwardly therefrom toward the out-of-the-way position if the proper positioning of the lenses 32 relative to the eyes 42 of the user is to be maintained.

In order to provide a means for maintaining the lens frame 30 in a normal position in alignment with the line of vision of the user a latch means is provided which includes a pair of resilient elements 44. Each of the elements 44 is secured to the lens frame 30 and is positioned thereon to be in alignment with support legs 24 of the main frame 12. With particular attention directed to FIGURE 6 of the drawings, it will be noted that each of the resilient elements 44 is provided with an inclined approach surface 46 and an inclined retaining surface 48. The resilient elements 44 are secured to the lens frame 30 in any convenient manner and project rearwardly therefrom so that downward movement of the lens frame 30 to the normal position in alignment with the line of sight of the user the inclined approach surfaces 46 will first engage the support legs 24 and bend the free ends of the elements 44 inwardly toward each other. Further movement of the lens frame 30 toward the normal position will pass the toe surface 50 of the elements 44 past the support legs 24 whereupon still further movement of the lens frame 30 to the normal position will enable the inherent resilience of the elements 44 to move the outer ends thereof behind the support legs 24 which will then be engaged with the retaining surfaces 48. Thus, the lens frame 30 is resiliently urged toward the limit position with the corresponding abutment surfaces 38 and 40 in surface-to-surface contacting relation thereby positively positioning the lens frame 30 relative to the main frame 12 and the temples 18.

In this manner, the lens frame 30 is properly positioned each time it is pivoted toward the normal position from the out-of-the-way position forwardly and above the main frame 12.

It will be noted, see FIGURE 2 in particular, that the main frame 12 conforms to and registers with the corresponding portions of the lens frame 30 when the lens frame 30 is pivoted to the normal position in alignment with the line of sight of the user which assures that the eyeglasses construction 10 will not offer obtrusive evidence that it is anything other than the normal type of eyeglasses construction. Thus, persons not wishing to be conspicuous by wearing bi-focals are provided with a convenient means whereby their vision may be assisted by the lenses 32 for viewing close objects and the lenses 32 may be pivoted to an out-of-the-way position for viewing distant objects if it is desired to do so.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An eyeglasses construction comprising: a main frame adapted to extend across and in front of the face of a user, support means intermediate the ends of said main frame adapted to engage the nose of a user, a pair of temples pivotally secured to the opposite ends of said main frame for movement about substantially vertically extending axes, a lens frame extending in front of and overlying said main frame and pivotally secured at its opposite ends to adjacent portions of said main frame for forward and upward pivotal movement about aligned horizontal axes between a first position in alignment with the line of sight of the user and a second position above the line of sight, first vertical abutment surfaces on the forward ends of each of said temples and second abutment surfaces on the ends of said lens frame engaging said first abutment surfaces when said temples are extended and project rearwardly from said main frame and said lens frame is pivoted downwardly to said first position wherein said first and second abutment surfaces define a limit of movement of said lens frame to said first position, latch means carried by said lens frame engaging said support means and frictionally retaining said lens frame in said first position against forward and upward swinging movement therefrom, said latch means comprising a pair of longitudinally spaced resilient elemens on said lens frame projecting rearwardly from a midportion of said lens frame subustantially equally spaced from opposite ends of said lens frame and engaged with portions of said main frame adjacent said support means yieldably urging said lens frame toward said first position with said first and second abutment surfaces in surface to surface contacting relation.

2. The combination of claim 1 wherein said first and second abutment means at each of said main frame comprise mating and complementary miter surfaces.

3. The combination of claim 1 wherein said main frame is shaped to register with the outline of said lens frame so as to be inconspicuous when said construction is viewed from the front.

4. An eyeglasses construction comprising: a main frame including a bridge, a pair of outwardly extending arms, the opposite ends of said bridge secured to said arms at a point inwardly from the inner end of each of said arms, the inner end of each of said arms curved downwardly forming a pair of support legs each having secured to the lower end thereof a nose pad, and a pair of temples pivotally secured near their forward ends to the outer end portions of the arms for movement about substantially vertical axes, the forward ends of said temples extending slightly beyond said frame so as to form vertical abutment surfaces; and a lens frame having a pair of lenses secured therein, said lens frame pivotally secured to the main frame at its outer ends by means of hinge assemblies for forward and upward pivotal movement about alinged horizontally disposed axes between a first position in alignment with the line of sight of a user and a second position above the line of sight, the outer ends of said lens frame extending beyond the hinge assemblies and forming vertical abutment surfaces adapted to engage the abutment surfaces on the temples when the lens frame is in the first position, said abutment surfaces defining a limit of movement of said lens frame to said first position, latch means carried by said lens frame engaging said support legs and frictionally retaining said lens frame in said first position against forward and upward pivotal movement therefrom, said latch means comprising a pair of spaced resilient elements on said lens frame projecting outwardly from a midsection of the rear surface of said frame so as to engage the support legs behind said nose pads and yieldably urge said lens frame toward said first position with said abutment surfaces in contacting relation.

5. The combination of claim 4 wherein said lens frame is of conventional shape and said main frame and hinge assemblies are shaped to register with the outline of said lens frame so as to be inconspicuous when viewed from the front.

References Cited by the Examiner

UNITED STATES PATENTS

| | | | |
|---|---|---|---|
| 411,971 | 10/1889 | Smith | 88—41 |
| 756,984 | 4/1904 | Searle | 88—41 |
| 2,282,637 | 5/1942 | Bouchard | 88—41 |
| 2,640,390 | 6/1953 | Muncy | 88—41 |
| 2,679,191 | 5/1954 | Tomlin | 88—41 |

FOREIGN PATENTS

| | | |
|---|---|---|
| 1,039,034 | 5/1953 | France. |
| 717,290 | 8/1953 | Great Britain. |

DAVID H. RUBIN, *Primary Examiner.*

EMIL G. ANDERSON, WILLIAM MISIEK, *Examiners.*

D. HORN, DONALD J. HOFFMAN, *Assistant Examiners.*